(12) United States Patent
Hachiya et al.

(10) Patent No.: US 8,674,653 B2
(45) Date of Patent: Mar. 18, 2014

(54) DC-DC CONVERTER

(75) Inventors: Koji Hachiya, Kasugai (JP); Yusaku Ido, Kani (JP); Yasumichi Omoto, Kasugai (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 257 days.

(21) Appl. No.: 13/229,427

(22) Filed: Sep. 9, 2011

(65) Prior Publication Data

US 2012/0062167 A1 Mar. 15, 2012

(30) Foreign Application Priority Data

Sep. 10, 2010 (JP) ................................. 2010-203045

(51) Int. Cl.
*H01M 10/46* (2006.01)
(52) U.S. Cl.
USPC ........................................................ 320/103
(58) Field of Classification Search
USPC .................. 320/103, 107, 114, 140
See application file for complete search history.

(56) References Cited

U.S. PATENT DOCUMENTS

| 6,154,015 | A | 11/2000 | Ichiba | |
|---|---|---|---|---|
| 2005/0063201 | A1 | 3/2005 | Yamazaki | |
| 2005/0194937 | A1* | 9/2005 | Jacobs | 320/135 |
| 2009/0079401 | A1 | 3/2009 | Mok et al. | |
| 2010/0207598 | A1 | 8/2010 | Hamatani | |
| 2012/0091965 | A1* | 4/2012 | Seo et al. | 320/128 |

FOREIGN PATENT DOCUMENTS

| CN | 101809853 A | 8/2010 |
|---|---|---|
| JP | S61-076034 A | 4/1986 |
| JP | 7-336812 A | 12/1995 |
| JP | 10-323027 A | 12/1998 |
| JP | 2000-201473 A | 7/2000 |
| JP | 2001161065 A | 6/2001 |
| JP | 2004166370 A | 6/2004 |
| JP | 2004-222429 A | 8/2004 |
| JP | 2004-328834 A | 11/2004 |
| JP | 2007-068349 A | 3/2007 |
| JP | 2009027774 A | 2/2009 |
| JP | 2009033859 A | 2/2009 |

OTHER PUBLICATIONS

Patent Abstracts of Japan Publication No. 2004-222429, Publication date Aug. 5, 2004, 1 page.
Patent Abstracts of Japan Publication No. 2000-201473, Publication date Jul. 18, 2000, 1 page.
Patent Abstracts of Japan Publication No. 07-336812, Publication date Dec. 22, 1995, 1 page.
Patent Abstracts of Japan Publication No. 2007-068349, Publication date Mar. 15, 2007, 1 page.

(Continued)

*Primary Examiner* — Edward Tso
(74) *Attorney, Agent, or Firm* — Osha Liang LLP

(57) ABSTRACT

A DC-DC converter includes a power conversion unit, a load amount detector, a charge detector that detects whether or not a battery is being charged, a switching frequency setting unit, and a switching controller. The load amount detector detects a load amount of the power conversion unit. The switching frequency setting unit sets a switching frequency of a switching element based on the load amount when the charge detector detects that the battery is not being charged, and sets the switching frequency of the switching element to a predetermined value when the charge detector detects that the battery is being charged.

5 Claims, 9 Drawing Sheets

(56) References Cited

OTHER PUBLICATIONS

Patent Abstracts of Japan Publication No. 2004-328834, Publication date Nov. 18, 2004, 1 page.

Patent Abstracts of Japan Publication No. 10-323027, Publication date Dec. 4, 1998, 1 page.

Office action issued in corresponding Chinese application 201110263417.3; dated Oct. 31, 2013; with English Translation (13 pages).

Office action issued in corresponding Japanese application 2010-203045; dated Dec. 3, 2013; with English Translation (5 pages).

* cited by examiner

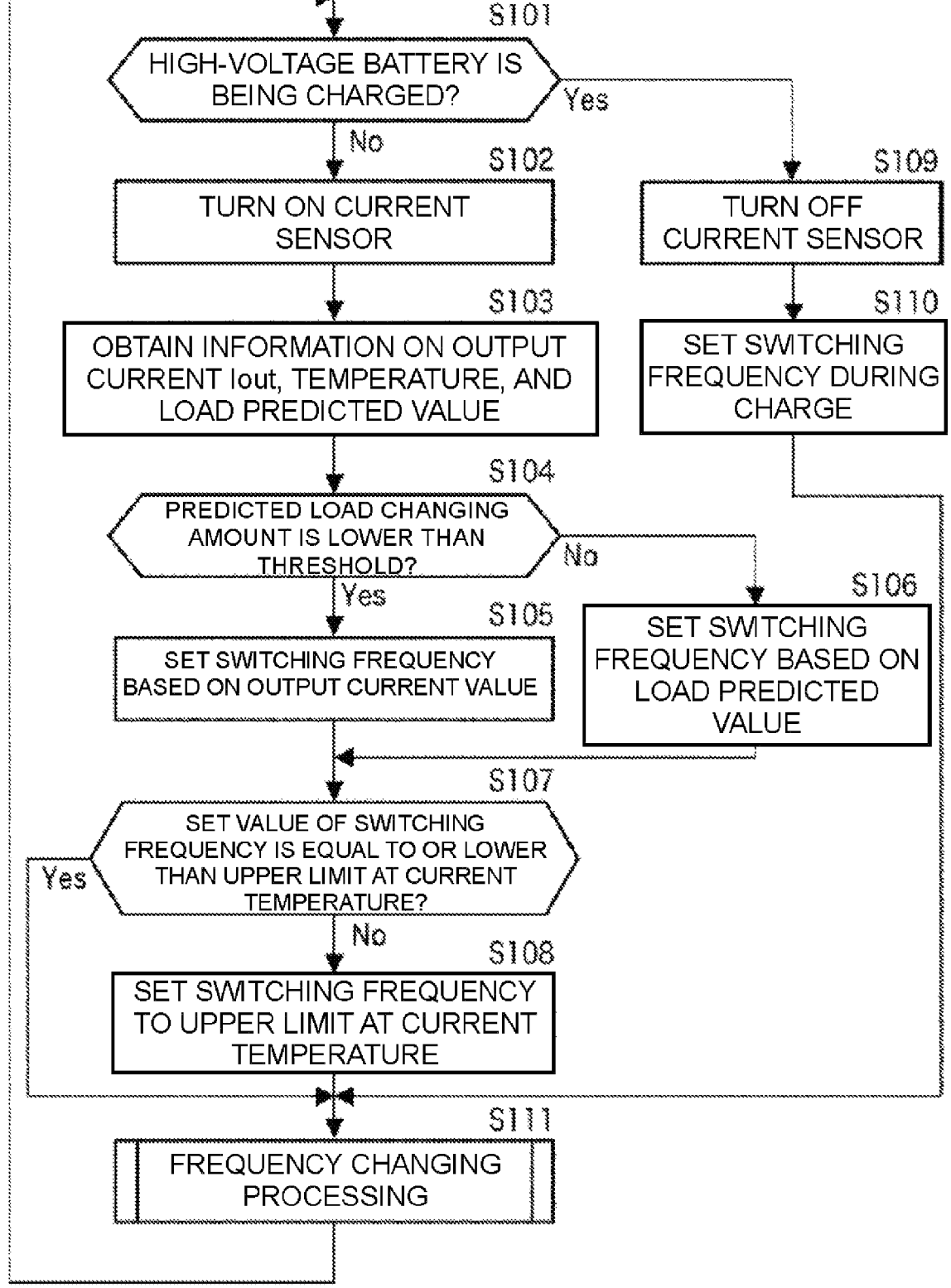

DC-DC CONVERTER

BACKGROUND OF THE INVENTION

1. Field of the Invention

The present invention relates to a DC-DC converter, and particularly relates to a DC-DC converter of which efficiency is improved.

2. Background Art

Two types of batteries, namely, a high-voltage battery and a low-voltage battery are usually provided in an electric-powered vehicle such as an EV (Electric Vehicle), an HEV (Hybrid Electric Vehicle), or a PHEV (Plug-in Hybrid Electric Vehicle).

The high-voltage battery is mainly used as a power supply for a load of a high voltage (hereinafter, referred to as a high-voltage load), such as a main power motor for driving wheels of the electric-powered vehicle to travel and a compressor motor of an air conditioner.

On the other hand, the low-voltage battery is mainly used as a power supply for a load of a low voltage (hereinafter, referred to as a low-voltage load), such as a motor for various ECUs (Electronic Control Units), EPSs (Electric Power Steerings), electric brakes, car audio devices, windshield wipers, and power windows, or an illumination lamp.

For example, a DC-DC converter steps down the voltage of the high-voltage battery to supply to the low-voltage battery in order to charge the low-voltage battery.

Conventionally, in a switching supply such as the DC-DC converter, various efforts have been made to reduce a power loss so as to enhance the efficiency.

For example, there is proposed a switching supply device that changes a frequency according to an output power so as to reduce a switching loss (see, for example, Japanese Unexamined Patent Publication No. 2004-222429).

There is also proposed a DC-DC converter which reduces a current amount necessary to charge or discharge a gate capacity of a switching transistor in a consumption current necessary to generate an internal clock by lowering a frequency in pulse-width modulation control of the switching transistor during a light load (see, for example, Japanese Unexamined Patent Publication No. 2000-201473).

There is proposed a power supply circuit in which the high energy conversion efficiency is achieved by varying an oscillation frequency of a DC-DC converter according to an output current of the DC-DC converter (see, for example, Japanese Unexamined Patent Publication No. 10-323027).

There is proposed a high-efficiency, high-performance stabilizing power supply device in which power saving is achieved by varying a switching frequency during a high load of a load device (see, for example, Japanese Unexamined Patent Publication No. 2004-328834).

There is proposed a switching supply device in which a frequency is changed from a low switching frequency to a high switching frequency at a changing current value I1 when an output current exists in a increasing process and the frequency is changed from the high switching frequency to the low switching frequency at a changing current value I2 lower than the changing current value I1 when an output current exists in a decreasing process, thereby achieving the high efficiency (see, for example, Japanese Unexamined Patent Publication No. 2007-68349).

Although not aimed at the high efficiency, in a power conversion control device that is used as both an inverter for driving a motor of an electric vehicle and a converter for charging a battery, in order to solve a noise problem, the number of switching times is decreased as less as possible to reduce a loss of the switching element because of a large current when the motor is driven, and a carrier frequency is set to a frequency in an ultrasound frequency range because of a small current when the battery is charged (see, for example, Japanese Unexamined Patent Publication No. 7-336812).

Generally, in a DC-DC converter, the efficiency is degraded during the low load, that is, the low power consumption of the load of the DC-DC converter. This is because a ratio of the power necessary for the control of the output power of the DC-DC converter increases relative to the output power of the DC-DC converter or a resonant power supply used in the DC-DC converter cannot perform ZVS (Zero Voltage Switching) during the low current.

On the other hand, when the electric-powered vehicle is connected to an outlet for household use for the purpose of the charging (so-called plug-in charging), the DC-DC converter is operated to change the low-voltage battery while the electric-powered vehicle is stopped. In this case, in the DC-DC converter, the efficiency is degraded because the output power is much smaller than that during the operation of the electric-powered vehicle. The sum of the power loss of the DC-DC converter increases because it takes a long period of time (for example, 8 hours) to perform the plug-in charging.

SUMMARY OF THE INVENTION

One or more embodiments of the present invention has been devised to improve the efficiency of a DC-DC converter.

In accordance with aspects of one or more embodiments of the present invention, a DC-DC converter includes: a power conversion unit that includes a switching element, steps down a voltage of a first battery by driving the switching element, and supplies the stepped-down voltage to a second battery and a load; a load amount detector that detects a load amount of the power conversion unit; a charge detector that detects whether or not the first battery is being charged; a switching frequency setting unit that sets a switching frequency of the switching element based on the load amount when the charge detector detects that the first battery is not being charged, and sets the switching frequency of the switching element to a predetermined value when the charge detector detects that the first battery is being charged; and a switching controller that controls the driving of the switching element at the switching frequency set by the switching frequency setting unit.

In the DC-DC converter according to one or more embodiments of the present invention, the voltage of the first battery is stepped down to be supplied to the second battery and the load, the load amount of the power conversion unit is detected, whether or not the first battery is being charged is detected. The switching frequency of the switching element is set based on the load amount when it is detected that the first battery is not being charged, and the switching frequency of the switching element is set to a predetermined value when it is detected that the first battery is being charged, so that the switching element is driven at the set switching frequency.

Accordingly, the efficiency of the DC-DC converter can be improved.

For example, the power conversion unit is a switching supply including a resonant power supply. For example, each of the load amount detector, the charge detector, the switching frequency setting unit, and the switching controller is an arithmetic device such as a CPU or an MPU.

The switching frequency setting unit can set the switching frequency to a lower value as the load amount is smaller when the charge detector detects that the first battery is not being charged.

Therefore, the efficiency of the DC-DC converter can further be improved.

There may be further provided a temperature detector that detects a temperature around the switching element, wherein the switching frequency setting unit can set the switching frequency based on the load amount and the temperature around the switching element when the charge detector detects that the first battery is not being charged.

Therefore, the temperature rise is suppressed around the switching element, and the efficiency of the DC-DC converter can further be improved.

For example, the temperature detector is a temperature sensor.

The load amount detector can obtain a predicted value of the load amount, and the switching frequency setting unit can set the switching frequency based on the load amount or the predicted value of the load amount when the charge detector detects that the first battery is not being charged.

The switching frequency can be controlled to an appropriate value while rapidly following the variation in load amount, and therefore the efficiency of the DC-DC converter can further be improved.

In accordance with aspects of one or more embodiments of the present invention, a DC-DC converter includes: a power conversion unit that includes a switching element, steps down a voltage of a first battery by driving the switching element, and supplies the stepped-down voltage to a second battery and a load; a charge detector that detects whether or not the first battery is being charged; a switching frequency setting unit that sets a switching frequency of the switching element to a value higher than that of a case where the charge detector detects that the first battery is being charged, when the charge detector detects that the first battery is not being charged; and a switching controller that controls the driving of the switching element at the switching frequency set by the switching frequency setting unit.

In the DC-DC converter according to one or more embodiments of the present invention, the voltage of the first battery is stepped down to be supplied to the second battery and the load, whether or not the first battery being charged is detected. The switching frequency of the switching element is set to a value higher than that of the case where it is detected that the first battery is being charged, when it is detected that the first battery is not being charged, so that the switching element is driven at the set switching frequency.

Accordingly, the efficiency of the DC-DC converter can be improved.

For example, the power conversion unit is a switching supply including a resonant power supply. For example, each of the charge detector, the switching frequency setting unit, and the switching controller is an arithmetic device such as a CPU or an MP.

According to aspects of the present invention, the efficiency of the DC-DC converter can be improved.

BRIEF DESCRIPTION OF THE DRAWINGS

FIG. 9 is a flowchart illustrating frequency control processing in accordance with one or more embodiments of the invention.

DETAILED DESCRIPTION

Specific embodiments of the invention will now be described in detail with reference to the accompanying figures.

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

Figure 1:
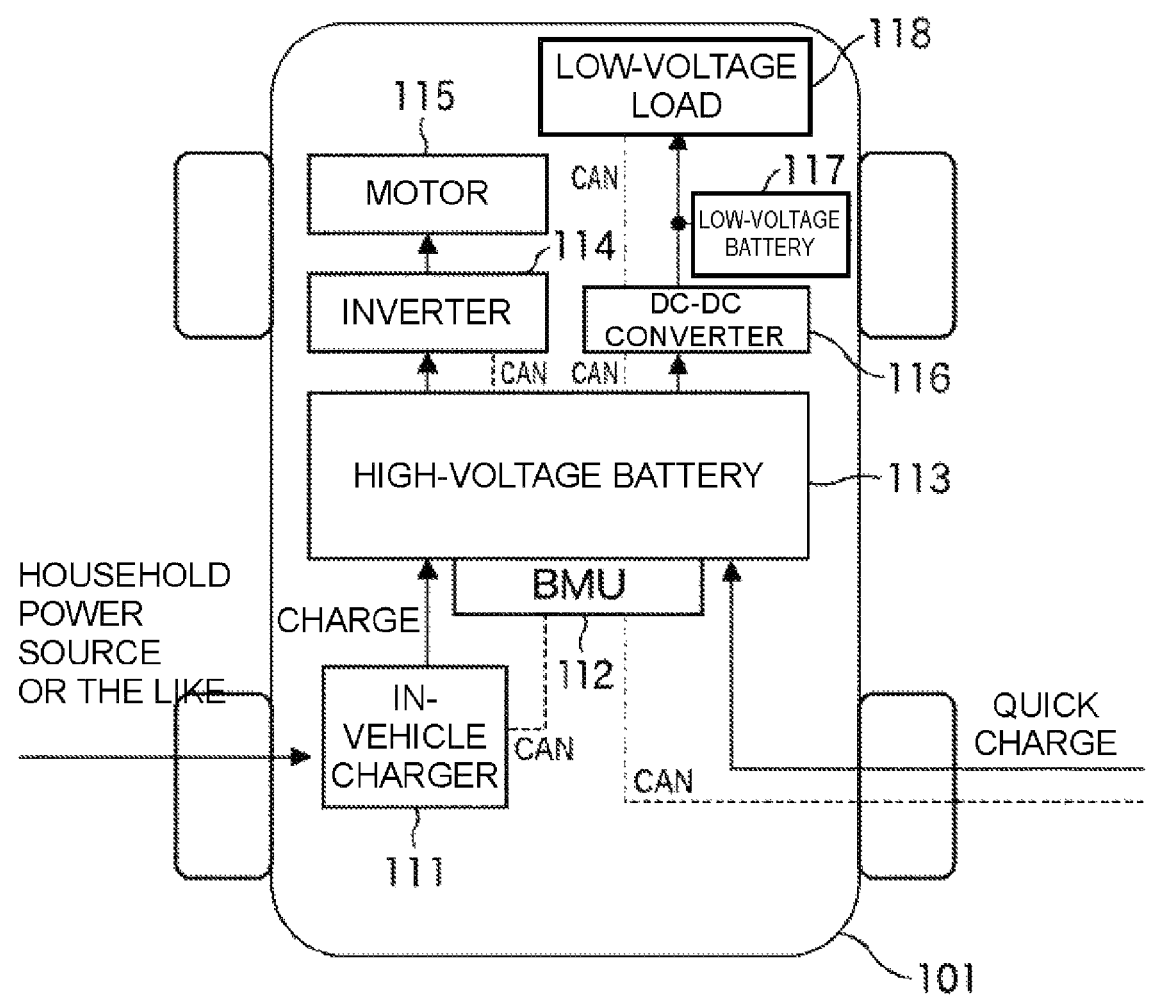
FIG. 1 is a block diagram illustrating a configuration example of an electric system of an electric-powered vehicle on which a DC-DC converter is mounted in accordance with one or more embodiments of the invention.

FIG. 1 is a block diagram illustrating a configuration example of an electric system of an electric-powered vehicle on which a DC-DC converter according to one or more embodiments of the present invention is mounted.

An electric-powered vehicle 101 is one in which a high-voltage battery 113 is used as a power source. The high-voltage battery 113 can be charged by two types of charge methods, namely, quick charge and normal charge. The quick charge in which a large current is consumed is a charge method of performing the charge in a short period of time by connecting the high-voltage battery 113 of the electric-powered vehicle 101 to a dedicated quick charge apparatus (not illustrated). On the other hand, the normal charge in which a current smaller than that of the quick charge is consumed is a charge method in which an in-vehicle charger 111 of a vehicle 1 is connected to a standard outlet provided in an ordinary home or office through a dedicated charge cable and the in-vehicle charger 111 charges the high-voltage battery 113 using a power supplied from a power source that is led from the connected outlet.

A BMU 112 conducts communication with the in-vehicle charger 111 and the quick charge apparatus based on the CAN (Controller Area Network) to control the normal charge and the quick charge of the high-voltage battery 113. The BMU 112 conducts communication with an inverter 114 and a DC-DC converter 116 based on the CAN to obtain information indicating operating conditions of the inverter 114 and the DC-DC converter 116 or supply information indicating a state of the high-voltage battery 113.

The inverter 114 converts the power of the high-voltage battery 113 from a direct current to an alternating current to supply the alternating-current power to a motor 115 that drives the electric-powered vehicle 101. The DC-DC converter 116 steps down the power of the high-voltage battery 113 to a predetermined voltage to supply the voltage to a low-voltage battery 117 and a low-voltage load 118. In addition to the motor 115 and the DC-DC converter 116, the power of the high-voltage battery 113 is also supplied to high-voltage load, such as a compressor motor (not illustrated) of an air conditioner, which is operated at a high voltage.

The low-voltage battery 117 is charged by the power supplied from the DC-DC converter 116, and the low-voltage battery 117 supplies the power to the low-voltage load 118.

The low-voltage load 118 includes a load, which is operated at a low voltage, such as a motor for ECUs, EPSs, electric brakes, car audio devices, car navigation systems, windshield wipers, and power windows, or an illumination lamp. Some of the loads of the low-voltage load 118 (such as the ECU) conduct communication with the DC-DC converter 116 based on the CAN to transmit and receive various pieces of information and signals.

Figure 2:
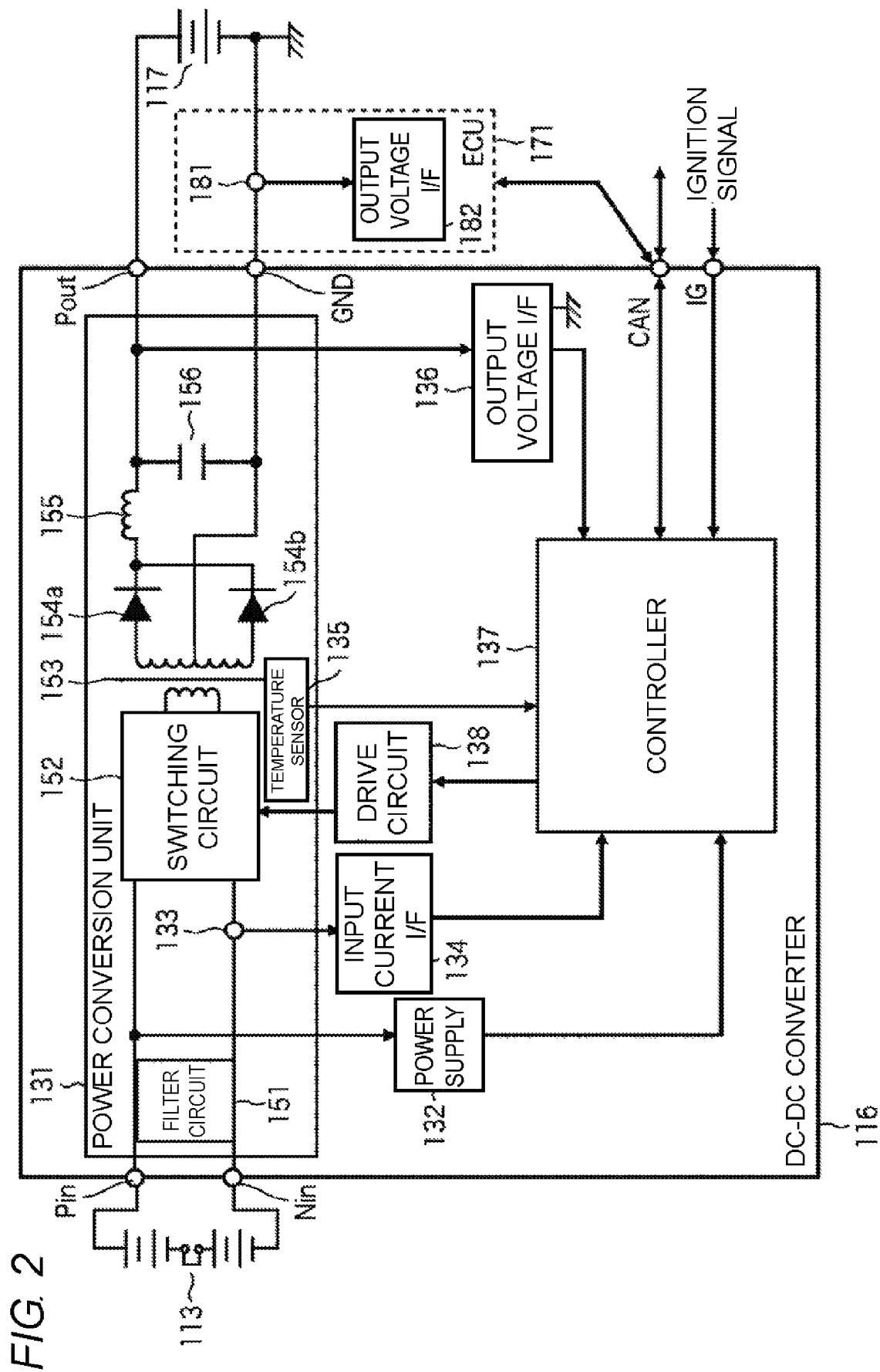
FIG. 2 is a circuit diagram illustrating a configuration example of the DC-DC converter in accordance with one or more embodiments of the invention.

FIG. 2 is a circuit diagram illustrating a configuration example of the DC-DC converter 116.

The DC-DC converter 116 includes a power conversion unit 131, a power supply 132, a current sensor 133, an input current interface (I/F) 134, a temperature sensor 135, an output voltage I/F 136, a controller 137, and a drive circuit 138. The power conversion unit 131 includes a filter circuit 151, a switching circuit 152, a transformer 153, diodes 154a and 154b, a coil 155, and a capacitor 156.

An input terminal Pin of the DC-DC converter 116 is connected to a positive electrode of the high-voltage battery 113, and an input terminal Nin is connected to a negative electrode of the high-voltage battery 113. An output terminal Pout of the DC-DC converter 116 is connected to a positive electrode of the low-voltage battery 117, and an output terminal GND is grounded while being connected to a negative electrode of the low-voltage battery 117.

FIG. 2 also illustrates an ECU 171 included in the low-voltage load 118 of FIG. 1. The ECU 171 includes a current sensor 181 and an output current I/F 182.

For example, the switching circuit 152 of the power conversion unit 131 includes a full-bridge or half-bridge inverter in which a switching element such as a MOSFET (Metal Oxide Semiconductor Field Effect Transistor) is used. The switching circuit 152 converts the power supplied from the high-voltage battery 113 into the alternating-current power. The filter circuit 151 removes a high-frequency noise generated by switching control of the switching circuit 152 so that the noise does not leak to the outside from the input side of the DC-DC converter 116. The filter circuit 151 also removes a drive noise from the motor 115 of FIG. 1.

The transformer 153 performs voltage conversion of the power converted into the alternating-current power by the switching circuit 152, and a rectifying circuit including the transformer 153 and the diodes 154a and 154b converts the power into the direct-current power having a predetermined voltage (for example, 14 V). A harmonic component is removed by an LC filter including the coil 155 and the capacitor 156, and output is the direct-current power of which voltage is converted.

The power supply 132 converts the voltage of the power supplied from the high-voltage battery 113 into a predetermined voltage (for example, 12 V) and supplies to the controller 137 as an operating power source.

The current sensor 133 detects a current before being input to the switching circuit 152, that is, an input current Iin of the DC-DC converter 116, and the current sensor 133 supplies a signal indicating the detection result to the input current I/F 134.

For example, the input current I/F 134 converts the analog signal indicating the detection result of the input current Iin into a digital signal and supplies the digital signal to the controller 137.

For example, the temperature sensor 135 is mounted around the switching element in the switching circuit 152 to detect an ambient temperature. The temperature sensor 135 supplies a signal indicating the detected temperature to the controller 137.

For example, the output voltage I/F 136 generates a digital signal indicating an output voltage Vout of the DC-DC converter 116 (power conversion unit 131) and supplies the signal to the controller 137.

For example, the current sensor 181 of the ECU 171 detects an output current Iout of the DC-DC converter 116 (power conversion unit 131) and supplies a signal indicating the detection result to the output current I/F 182.

For example, the output current I/F 182 converts the analog signal indicating the detection result of the output current Iout into a digital signal and supplies the digital signal to the controller 137.

The controller 137 sets instruction values of a switching frequency of the switching circuit 152 and the output voltage Vout of the power conversion unit 131 based on the input current Iin, the output voltage Vout, and the output current Iout, and notifies the drive circuit 138 of the set instruction values. The controller 137 conducts communication with external devices such as the BMU 112 and the ECU 171 based on the CAN to transmit and receive various pieces of information and signals. An ignition signal providing an instruction to start up or stop the power supply is input to the controller 137 from an ignition switch or a start switch that turn on and off the electric-powered vehicle.

The drive circuit 138 supplies a driving signal having the switching frequency instructed by the controller 137 to the switching circuit 152, and the drive circuit 138 performs PWM control (for example, control of a duty ratio) of the switching circuit 152 to control the output voltage of the switching circuit 152 so that the output voltage Vout of the power conversion unit 131 has the instruction value received from the controller 137.

In a case where the switching circuit 152 is of the hard switching type, a loss generated in turning on and off the switching element (hereinafter, referred to as a switching loss) is a main factor degrading the conversion efficiency of the DC-DC converter 116.

Figure 3:
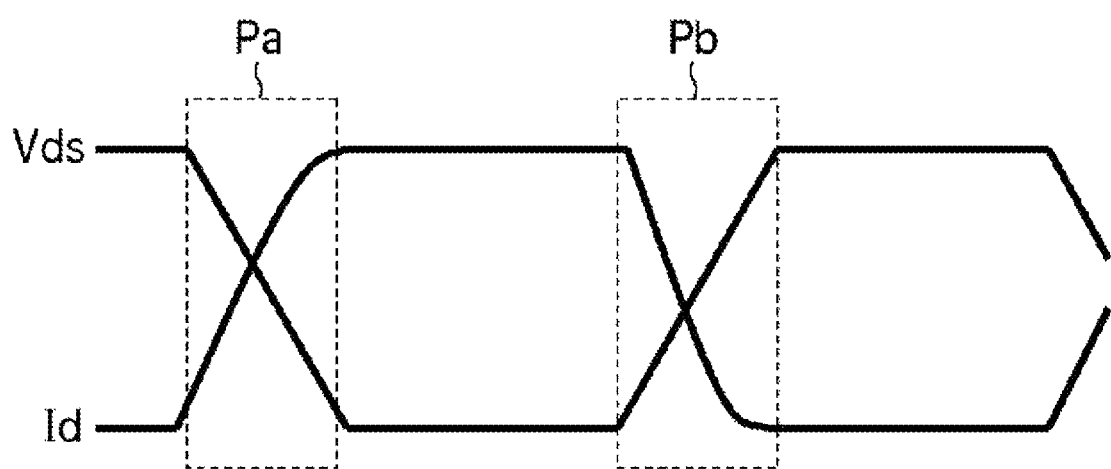
FIG. 3 is a graph illustrating a switching loss.

FIG. 3 is a graph illustrating waveform examples of a drain-source voltage Vds and a drain current Id in turning on and off the switching element for the switching circuit 152 of the hard switching type. As illustrated in FIG. 3, in the switching circuit 152 of the hard switching type, the switching loss is generated because the voltage Vds×the current Id is not equal to zero in a period Pa during which the switching element is turned on and a period Pb during which the switching element is turned off.

The switching loss increases as the switching frequency of the switching circuit 152 is higher. On the other hand, the switching circuit 152 can be miniaturized as the switching frequency is higher.

A resonant power supply in which the ZVS can be performed is well known as a technique of improving the switching loss. For example, the power conversion unit 131 of the DC-DC converter 116 includes a resonant power supply illustrated in FIG. 4.

Figure 4:
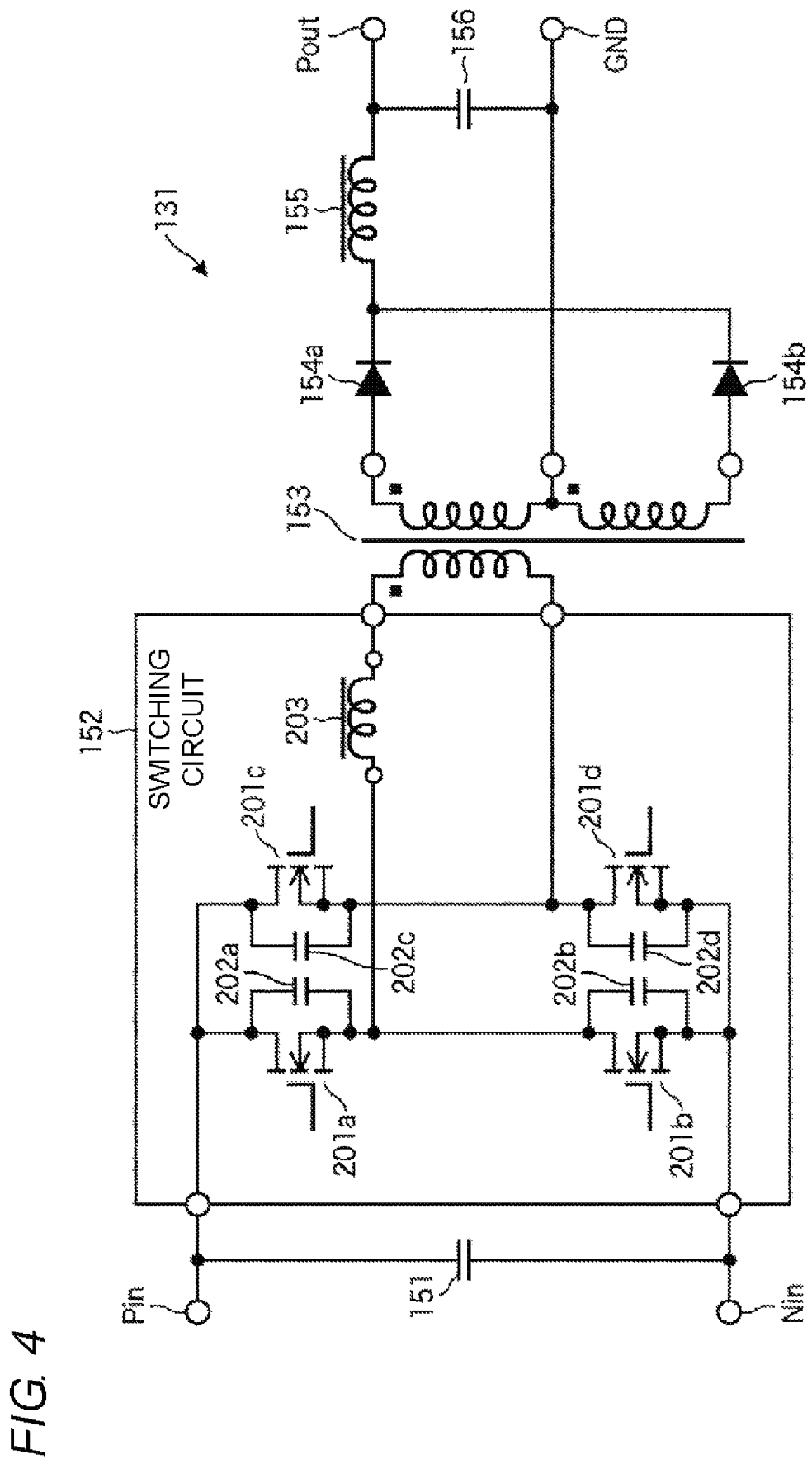
FIG. 4 is a circuit diagram illustrating a configuration example of a power conversion unit of the DC-DC converter in accordance with one or more embodiments of the invention.

In the power conversion unit 131 of FIG. 4, the filter circuit 151 includes a capacitor. The switching circuit 152 includes an inverter of a single-phase full-bridge type, including switching elements 201a to 201d, capacitors 202a to 202d, and a coil 203.

More specifically, a drain of the switching element 201a is connected to the input terminal Pin of the DC-DC converter 116 and a drain of the switching element 201c. A source of the switching element 201a is connected to a drain of the switching element 201b and one end of the coil 203. A source of the switching element 201b is connected to the input terminal Nin of the DC-DC converter 116 and a source of the switching element 201d. A source of the switching element 201c is connected to a drain of the switching element 201d and an input terminal of the transformer 153. One end of the coil 203, which is different from the end connected to the source of the switching element 201a, is connected to an input terminal of the transformer 153, which is different from the input terminal connected to the drain of the switching element 201d. The capacitors 202a to 202d are connected between the sources and the drains of the switching elements 201a to 201d, respectively.

In the switching circuit 152, the capacitors 202 to 202d and the coil 203 are resonated to eliminate the drain-source voltage at the moment of turning on or turning off the switching elements 201a to 201d, that is, the ZVS is performed, thereby eliminating the switching loss.

However, in the switching circuit 152, the ZVS cannot be performed at the low load. Therefore, a ratio of the switching loss to the output power of the DC-DC converter 116 increases at the low load to degrade the efficiency. As described later with reference to FIGS. 6 to 9 and the like, a measure for improving the efficiency at the low load is taken in the DC-DC converter 116.

(Configuration Example of Controller 137)

Figure 5:
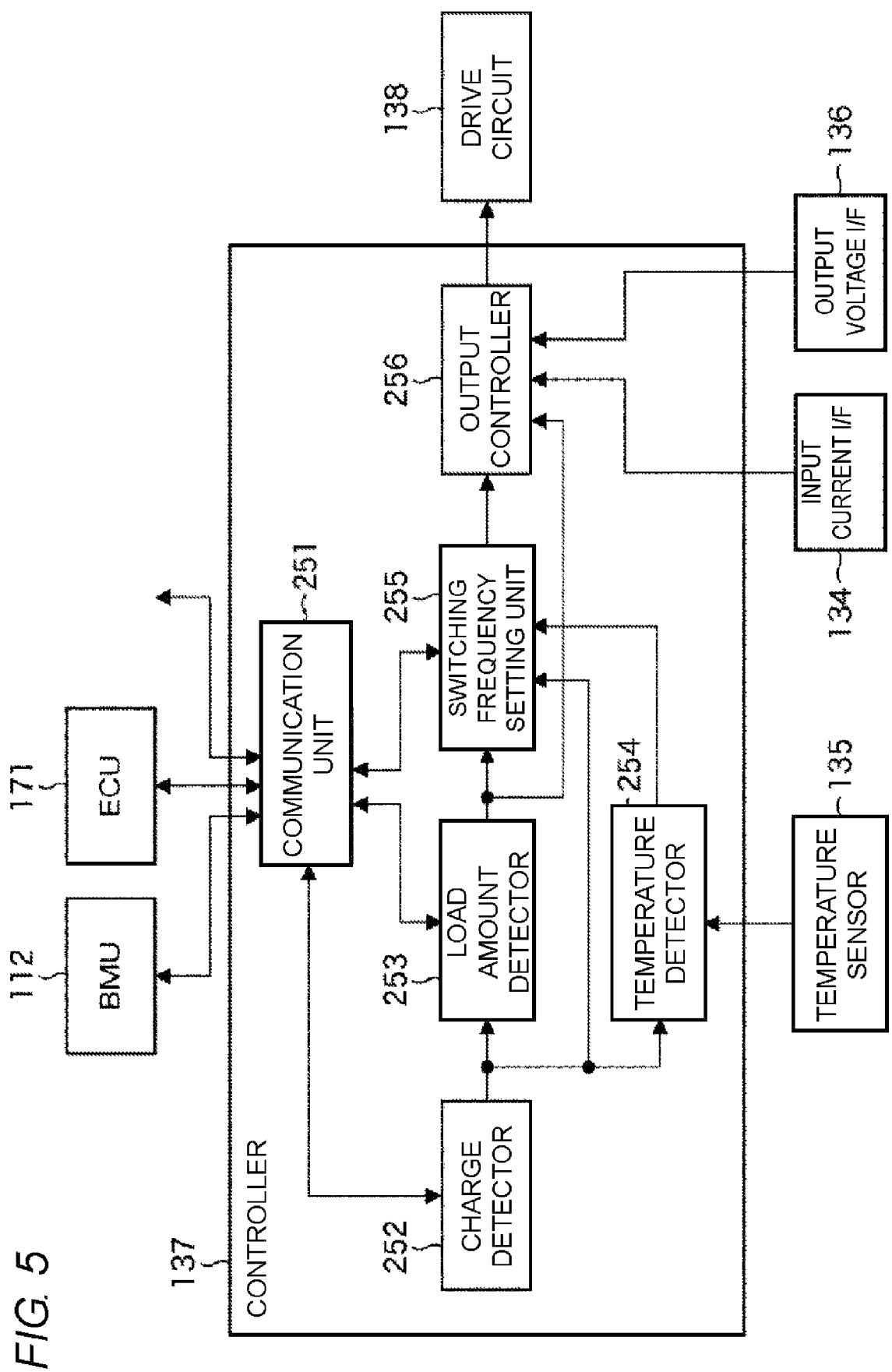
FIG. 5 is a block diagram illustrating a configuration example of a function of a controller in accordance with one or more embodiments of the invention.

FIG. 5 is a block diagram illustrating a configuration example of a function of the controller 137. The controller 137 includes a communication unit 251, a charge detector 252, a load amount detector 253, a temperature detector 254, a switching frequency setting unit 255, and an output controller 256.

The communication unit 251 conducts communication with the BMU 112, the ECU 171, the other ECUs and the like included in the low-voltage load 118 based on the CAN to transmit and receive various pieces of information and signals. The communication unit 251 supplies the obtained signal and information to the charge detector 252, the load amount detector 253, and the switching frequency setting unit 254 as needed.

The charge detector 252 detects whether or not the high-voltage battery 113 is being charged based on the information supplied from the BMU 112 through the communication unit 251, and notifies the load amount detector 253, the temperature detector 254, and the switching frequency setting unit 255 of the detection result.

The load amount detector 253 detects the output current Iout indicating a load amount of the power conversion unit 131 based on the signal supplied from the output current I/F 136 of the ECU 171 and notifies the switching frequency setting unit 255 and the output controller 256 of the detection result. The load amount detector 253 obtains a predicted value (hereinafter, referred to as a load predicted value) of the load amount of the low-voltage load 118 from the ECU (not illustrated) or the like through the communication unit 251 and notifies the switching frequency setting unit 255 of the obtained load predicted value. The load amount detector 253 also controls the turn-on and turn-off of the ECU 171 through the communication unit 251.

The temperature detector 254 detects a temperature around the switching elements 201a to 201d based on the signal supplied from the temperature sensor 135 and notifies the switching frequency setting unit 255 of the detection result.

The switching frequency setting unit 255 sets the switching frequency of the switching circuit 152 based on the output current Iout, the temperature around the switching elements 201a to 201d, and the load predicted value. The switching frequency setting unit 255 notifies the output controller 256 of the set switching frequency.

The output controller 256 detects the input current Iin based on the signal supplied from the input current I/F 134 and detects the output voltage Vout based on the signal supplied from the output voltage I/F 136. The output controller 256 sets the instruction value of the output voltage Vout of the power conversion unit 131 based on the input current Iin, the output voltage Vout, and the output current Iout and notifies the drive circuit 138 of the set instruction value. The output controller 256 notifies the drive circuit 138 of the switching frequency set by the switching frequency setting unit 255 as the instruction value.

Described next is frequency control processing performed by the DC-DC converter 116 with reference to a flowchart of FIG. 6. The frequency control processing is started once the DC-DC converter 116 is started, and the frequency control processing is ended once the DC-DC converter 116 is stopped.

In Step S1, the charge detector 252 determines whether or not the high-voltage battery 113 is being charged based on the information supplied from the BMU 112 through the communication unit 251. When determining that the high-voltage battery 113 is not being charged, the processing goes to Step S2. At this point, the charge detector 252 notifies the load amount detector 253, the temperature detector 254, and the switching frequency setting unit 255 that the high-voltage battery 113 is not being charged.

In Step S2, the load amount detector 253 turns on the current sensor 181. Specifically, the load amount detector 253 supplies a start-up signal to the ECU 171 through the communication unit 251. Therefore, the ECU 171 is turned on, and the current sensor 181 and the output current I/F 182 that are mounted on the ECU 171 are turned on. The current sensor 181 starts to detect the output current Iout of the DC-DC converter 116.

The processing in Step S2 is not performed when the ECU 171 is already turned on.

In Step S3, the load amount detector 253 detects the output current Iout. That is, the load amount detector 253 detects the output current Iout indicating the load amount of the power conversion unit 131 based on the signal supplied from the output current I/F 136 of the ECU 171. The load amount detector 253 notifies the switching frequency setting unit 255 and the output controller 256 of the detection result of the output current Iout.

In Step S4, the switching frequency setting unit 255 sets the switching frequency based on the output current Iout. For example, the switching frequency setting unit 255 selects one of predetermined frequencies having a plurality of levels based on the output current Iout and sets as the switching frequency at which the switching circuit 152 is driven. In this case, the higher switching frequency is selected as the output current Iout is larger, that is, as the load amount of the low-voltage load 118 is larger, while the lower switching frequency is selected as the output current Iout is smaller, that is, as the load amount of the low-voltage load 118 is smaller. For example, a frequency of 80 kHz can be used as the low switching frequency, a frequency of 100 kHz can be used as the intermediate switching frequency, and a frequency of 120 kHz can be used as the high switching frequency. The switching frequency setting unit 255 notifies the output controller 256 of the selected switching frequency.

Then, the processing goes to Step S7.

On the other hand, when the high-voltage battery 113 is determined as being charged in Step S1, the processing goes to Step S5. At this point, the charge detector 252 notifies the load amount detector 253, the temperature detector 254, and the switching frequency setting unit 255 that the high-voltage battery 113 is being charged.

In Step S5, the load amount detector 253 turns off the current sensor 181. Specifically, the load amount detector 253 supplies a stop signal to the ECU 171 through the communication unit 251. Therefore, the ECU 171 is turned off, and the current sensor 181 and the output current I/F 182 that are mounted on the ECU 171 are turned off.

In Step S6, the switching frequency setting unit 255 sets the switching frequency during the charge. That is, the switching frequency setting unit 255 sets the predetermined switching frequency during the charge to the switching frequency at which the switching circuit 152 is driven. For example, the switching frequency during the charge is set to a frequency (for example, 80 kHz) that is equal to or lower than a minimum value of the switching frequency set in a case where the high-voltage battery 113 is not charged. The switching frequency setting unit 255 notifies the output controller 256 of the set switching frequency.

Then, the processing goes to Step S7.

The pieces of processing in Steps S5 and S6 are not performed when the ECU 171 is already turned off and the switching frequency during the charge is set.

In Step S7, the output controller 256 performs frequency changing processing. The detailed frequency changing processing will be described with reference to a flowchart of FIG. 7.

In Step S21, the output controller 256 detects the switching frequency at which the drive circuit 138 currently drives the switching circuit 152.

Figure 6:
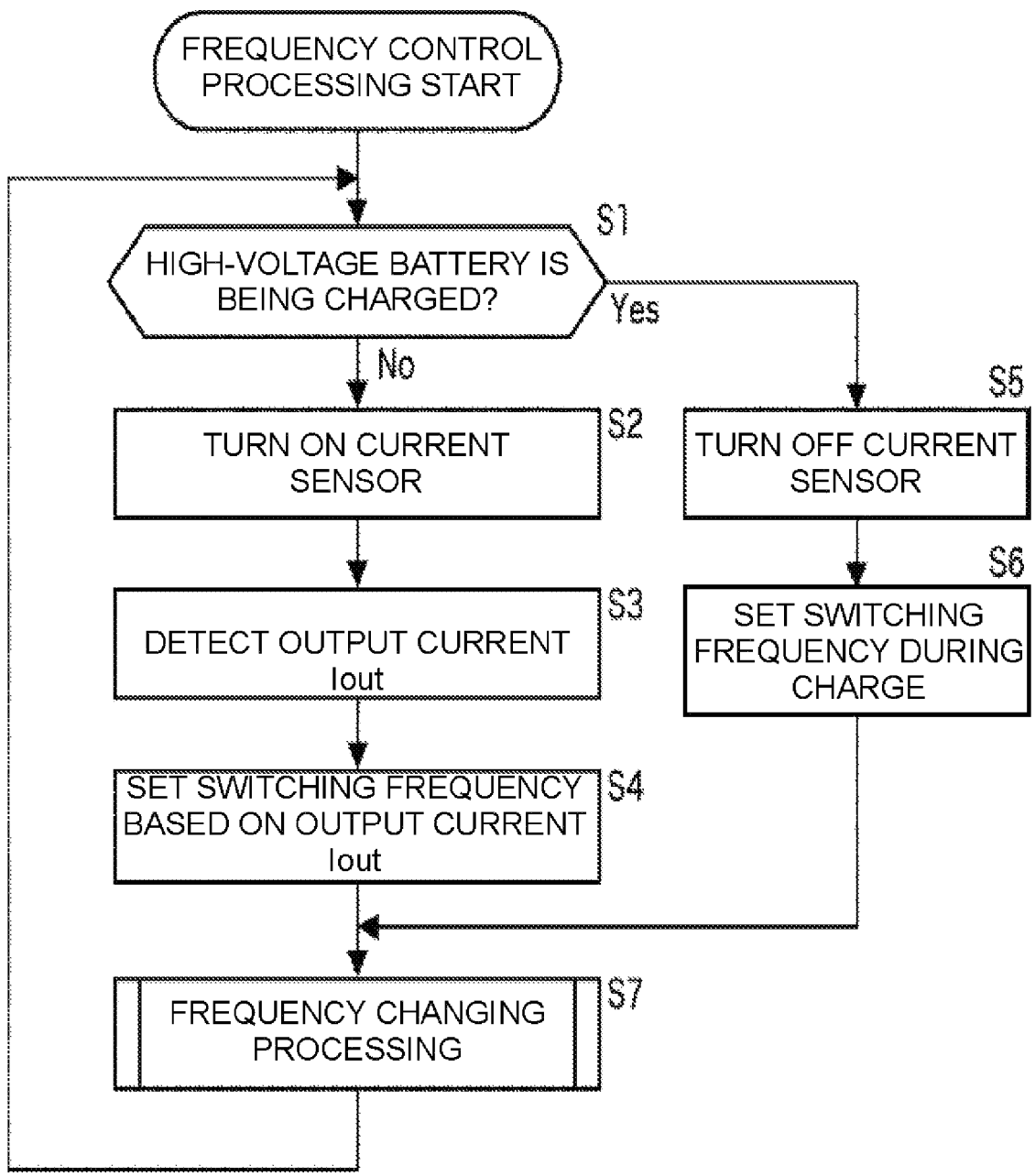
FIG. 6 is a flowchart illustrating frequency control processing in accordance with one or more embodiments of the invention.
Figure 7:
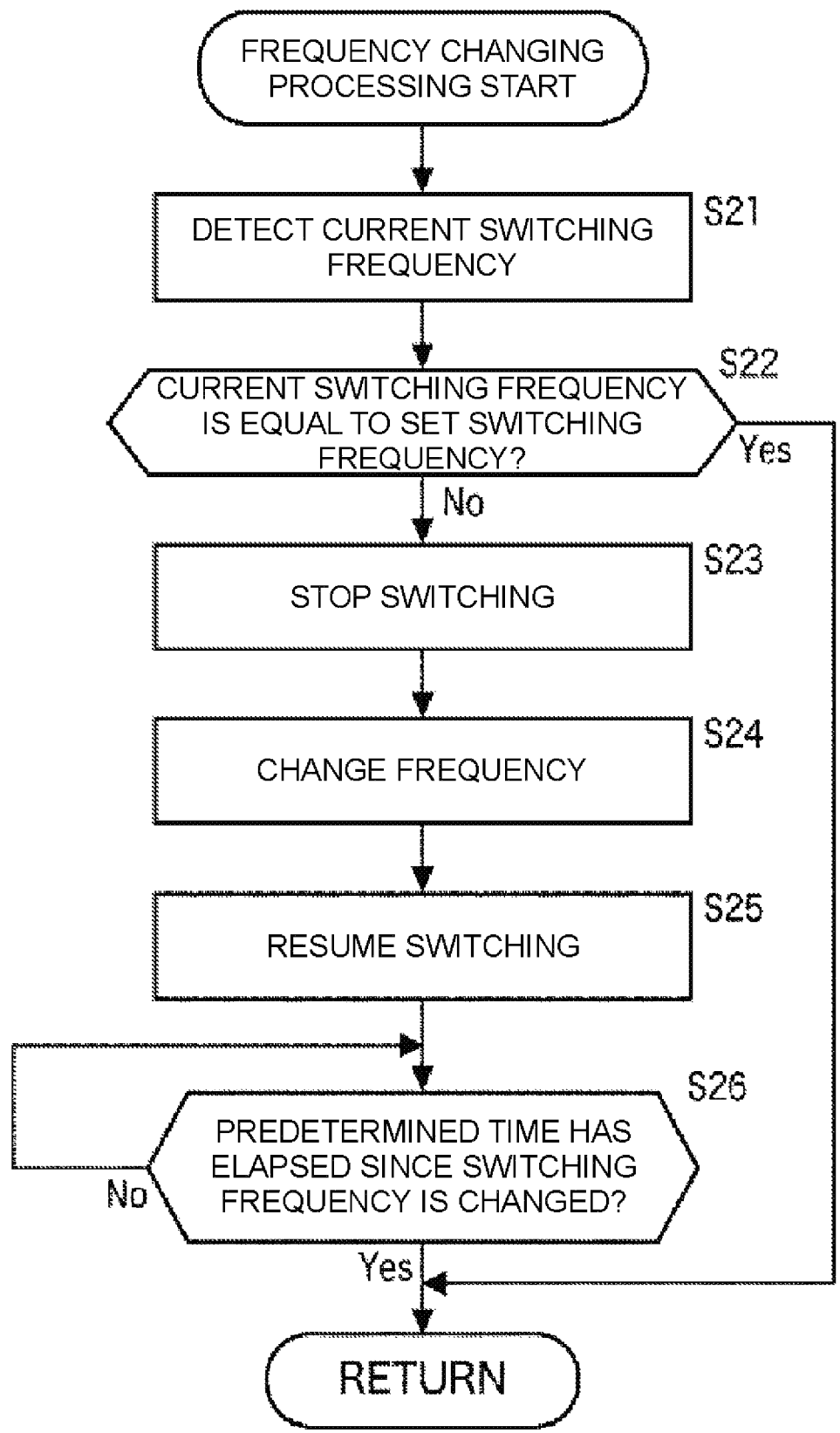
FIG. 7 is a flowchart illustrating detailed frequency changing processing in accordance with one or more embodiments of the invention.

In Step S22, the output controller 256 determines whether or not the current switching frequency is equal to the switching frequency set through the processing in Step S4 or S6 of FIG. 6. When the current switching frequency is different from the set switching frequency, the processing goes to Step S23.

In Step S23, the switching circuit 152 stops the switching. Specifically, the output controller 256 provides an instruction to stop the switching to the drive circuit 138, and the drive circuit 138 stops supplying the driving signal to the switching circuit 152. Therefore, the switching circuit 152 stops the switching.

In Step S24, the drive circuit 138 changes the switching frequency. Specifically, the output controller 256 notifies the drive circuit 138 of the switching frequency set newly as the instruction value by the switching frequency setting unit 255. The drive circuit 138 changes the frequency (carrier frequency) of a carrier signal, which is used to generate the driving signal of the switching circuit 152, to a value corresponding to the instructed switching frequency.

In Step S25, the switching circuit 152 resumes the switching. Specifically, the drive circuit 138 resumes the supply of the driving signal to the switching circuit 152. Therefore, the switching circuit 152 resumes the switching at the newly set switching frequency.

Thus, the operation of the switching circuit 152 is stopped for a predetermined period of time (for example, 10 μs) upon changing the switching frequency, thereby allowing the prevention of overvoltage of the output voltage which is possibly generated in changing the switching frequency.

In Step S26, the output controller 256 determines whether or not a predetermined period of time has elapsed since the switching frequency is changed. The processing in Step S26 is repeated until being determined that the predetermined period of time has elapsed since the switching frequency is changed. The frequency changing processing is ended when it is determined that the predetermined period of time has elapsed since the switching frequency is changed.

Therefore, the second changing of the switching frequency is prohibited for the predetermined period of time after the switching frequency is changed, thereby preventing oscillation of the switching frequency caused by chattering of a charge signal or the like.

Referring again to FIG. 6, the processing returns to Step S1 after the frequency changing processing in Step S7 is ended, and the pieces of processing from Step S1 are repeatedly performed.

As described above, the switching frequency of the switching circuit 152 is controlled separately in a case where the high-voltage battery 113 is being charged and in a case where the high-voltage battery 113 is not being charged, which allows the improvement of the efficiency of the DC-DC converter 116.

Specifically, when the high-voltage battery 113 is not being charged, such as when the electric-powered vehicle is traveling, the loads being used increase among the loads included in the low-voltage load 118, and a variation in load increases while the load on the DC-DC converter 116 increases. On the other hand, when the high-voltage battery 113 is being charged, the loads being used among the loads included in the low-voltage load 118 are limited to some electric components, and the variation in load decreases while the load on the DC-DC converter 116 decreases. As described above, the switching loss increases in the switching circuit 152 at the low load. Accordingly, when the switching frequency during the charge is set lower in the high-voltage battery 113, the switching loss can be reduced to improve the efficiency of the DC-DC converter 116.

In both the case where the high-voltage battery 113 is being charged and the case where the high-voltage battery 113 is not being charged, because the switching frequency can be controlled based only on the information from the BMU 112, the control of the switching frequency can be implemented in a simple configuration.

As described above, when the high-voltage battery 113 is not being charged, the switching frequency is set lower as the load amount (output current Iout) of the DC-DC converter 116 is smaller, which allows the efficiency of the DC-DC converter 116 to be further improved.

As described above, the ECU 171 that is not used is turned off during the charge of the high-voltage battery 113, which reduces power consumption.

Frequency control processing according to one or more embodiments performed by the DC-DC converter 116 will be described with reference to a flowchart of FIG. 8. The frequency control processing is started once the DC-DC converter 116 is started and is ended once the DC-DC converter 116 is stopped.

In Step S51, similarly to the processing in Step S1 of FIG. 6, it is determined whether or not the high-voltage battery 113 is being charged. When it is determined that the high-voltage battery 113 is not being charged, the processing goes to Step S52.

In Step S52, the current sensor 181 is turned on similarly to the processing in Step S2 of FIG. 6.

In Step S53, the controller 137 obtains pieces of information on the output current Iout and the temperature. Specifically, similarly to the processing in Step S3 of FIG. 6, the load amount detector 253 detects the output current Iout and notifies the switching frequency setting unit 255 and the output controller 256 of the detection result. The temperature detector 254 detects the temperature around the switching elements 201a to 201d based on a signal supplied from the temperature sensor 135 and notifies the switching frequency setting unit 255 of the detection result.

In Step S54, the switching frequency is set based on the output current Iout similarly to the processing in Step S4 of FIG. 6.

In Step S55, the switching frequency setting unit 255 determines whether or not the set value of the switching frequency is equal to or lower than an upper limit at the current temperature. Specifically, the upper limit of the switching frequency is previously fixed with respect to the temperature detected by the temperature sensor 135. The switching frequency setting unit 255 compares the switching frequency set in the processing in Step S54 and the upper limit of the switching frequency at the temperature detected in the processing in Step S53. When it is determined that the set value of the switching frequency is larger than the upper limit, the processing goes to Step S56.

In Step S56, the switching frequency setting unit 255 sets the switching frequency to the upper limit at the current temperature. Then, the processing goes to Step S59.

Meanwhile, when it is determined that the set value of the switching frequency is equal to or lower than the upper limit at the current temperature in Step S55, the processing in Step S56 is skipped and the processing goes to Step S59 without changing the set value of the switching frequency.

When it is determined that the high-voltage battery 113 is being charged in Step S51, the processing goes to Step S57.

In Step S57, the current sensor 181 is turned off similarly to the processing in Step S5 of FIG. 6. In Step S58, the switching frequency during the charge is set similarly to the processing in Step S6 of FIG. 6. Then, the processing goes to Step S59.

In Step S59, the frequency changing processing described earlier with reference to FIG. 7 is performed. Then, the processing returns to Step S51, and the pieces of processing from Step S51 are repeatedly performed.

As described above, the switching frequency is set lower at the high temperature around the switching elements 201a to 201d. Therefore, the temperature rise is suppressed around the switching elements 201a to 201d, and a power loss caused by the temperature rise can be reduced.

Then, Frequency control processing according to one or more embodiments performed by the DC-DC converter 116 will be described with reference to a flowchart of FIG. 9. The frequency control processing is started once the DC-DC converter 116 is started and is ended once the DC-DC converter 116 is stopped.

In Step S101, similarly to the processing in Step S1 of FIG. 6, it is determined whether or not the high-voltage battery 113 is being charged. When it is determined that the high-voltage battery 113 is not being charged, the processing goes to Step S102.

In Step S102, the current sensor 181 is turned on similarly to the processing in Step S2 of FIG. 6.

In Step S103, the controller 137 obtains pieces of information on the output current Iout, the temperature, and the load predicted value. Specifically, similarly to the processing in Step S2 of FIG. 6, the load amount detector 253 detects the output current Iout and notifies the output controller 256 of the detection result. The temperature detector 254 detects the temperature around the switching elements 201a to 201d based on a signal supplied from the temperature sensor 135 and notifies the switching frequency setting unit 255 of the detection result. The load amount detector 253 obtains the load predicted value of the low-voltage load 118 from the ECU (not illustrated) or the like through the communication unit 251.

In Step S104, the load amount detector 253 determines whether or not a predicted load changing amount is lower than a predetermined threshold. Specifically, the load amount detector 253 computes the predicted load changing amount that is a predicted value of a load changing amount based on the current output current Iout and the load predicted value of the low-voltage load 118. When the load amount detector 253 determines that the computed predicted load changing amount is lower than the predetermined threshold, the processing goes to Step S105. At this point, the load amount detector 253 notifies the switching frequency setting unit 255 of the detection result of the output current Iout.

In Step S105, similarly to the processing in Step S4 of FIG. 6, the switching frequency is set based on the output current Iout. Then, the processing goes to Step S107.

Meanwhile, when it is determined that the predicted load changing amount is not lower than the predetermined threshold in Step S104, the processing goes to Step S106. At this point, the load amount detector 253 notifies the switching frequency setting unit 255 of the load predicted value of the low-voltage load 118.

In Step S106, similarly to the processing in Step S4 of FIG. 6, the switching frequency setting unit 255 sets the switching frequency based on the load predicted value of the low-voltage load 118 instead of the output current Iout. Then, the processing goes to Step S107.

Figure 8:
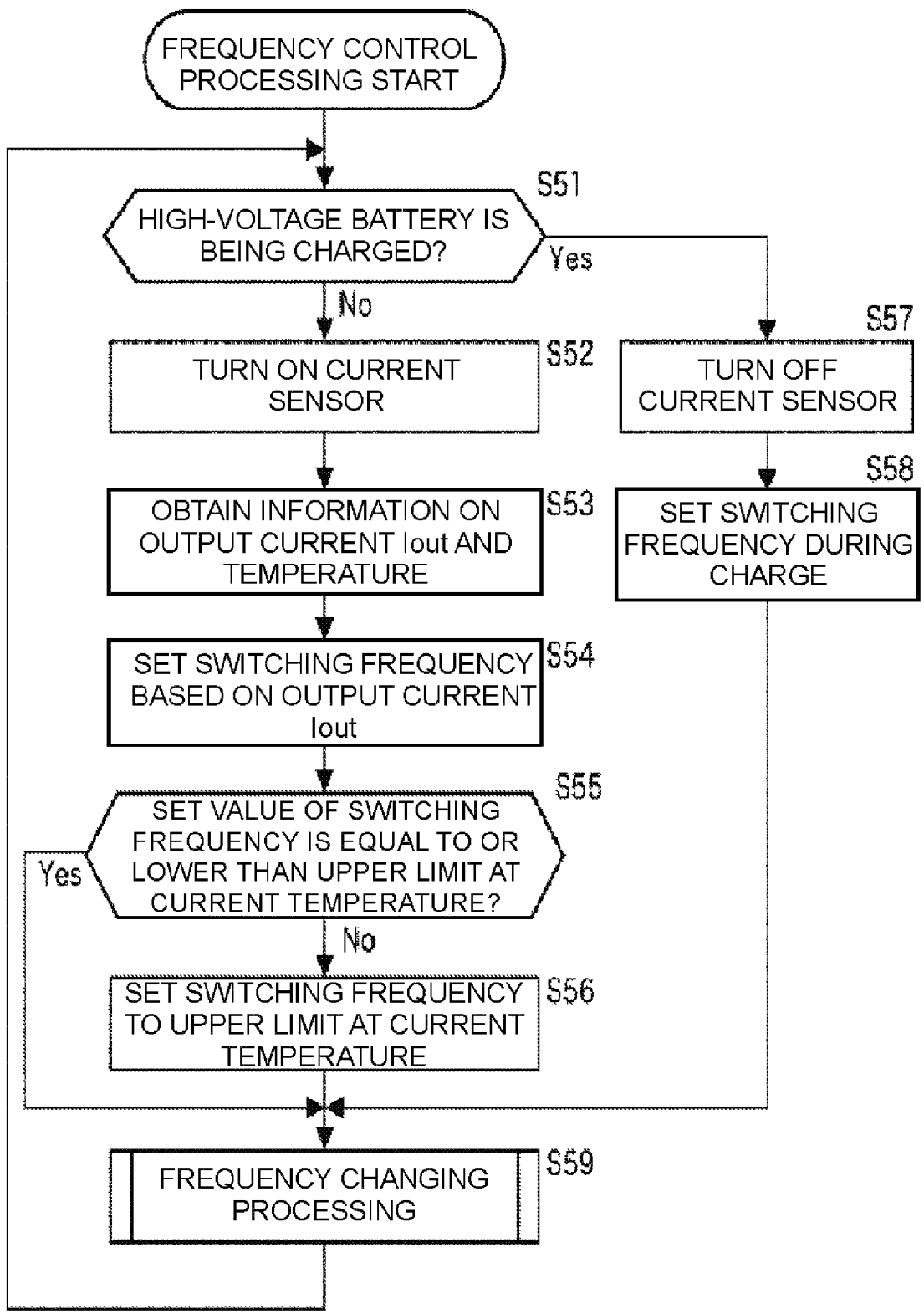
FIG. 8 is a flowchart illustrating frequency control processing in accordance with one or more embodiments of the invention.

In Step S107, similarly to the processing in Step S55 of FIG. 8, it is determined that whether or not the set value of the switching frequency is equal to or lower than the upper limit at the current temperature. When it is determined that the set value of the switching frequency is larger than the upper limit, the processing goes to Step S108.

In Step S108, similarly to the processing in Step S56 of FIG. 8, the switching frequency is set to the upper limit at the current temperature. Then, the processing goes to Step S111.

Meanwhile, when the set value of the switching frequency is equal to or lower than the upper limit at the current temperature in Step S107, the processing in Step S108 is skipped, and the processing goes to Step S111.

When it is determined that the high-voltage battery 113 is being charged in Step S101, the processing goes to Step S109.

In Step S109, the current sensor 181 is turned off similarly to the processing in Step S5 of FIG. 6. In Step S110, the switching frequency during the charge is set similarly to the processing in Step S6 of FIG. 6. Then, the processing goes to Step S111.

In Step S111, the frequency changing processing described earlier with reference to FIG. 7 is performed. Then, the processing returns to Step S101, and the pieces of processing from Step S101 are repeatedly performed.

In this manner, the switching frequency can be controlled to an appropriate value while rapidly following the variation in load amount of the low-voltage load 118, and therefore the efficiency of the DC-DC converter 116 can further be improved.

It is conceivable for a user to use electric components such as an air conditioner or an audio device in the vehicle even when the high-voltage battery 113 is being charged. Accordingly, for example, while the high-voltage battery 113 is being charged, the switching frequency during the charge may be set when it is determined that a person does not exist in the electric-powered vehicle based on a lock state of the electric-powered vehicle, and otherwise the normal control of the switching frequency may be performed or the frequency may be set to be higher than the switching frequency during the charge. Alternatively, for example, during the charge of the high-voltage battery 113, the switching frequency during the charge may be set when it is determined that a person is not using the electric component in the electric-powered vehicle based on an ignition signal or the like, and otherwise the normal control of the switching frequency may be performed or the frequency may be set to be higher than the switching frequency during the charge.

The switching frequency may be changed by means of either software or hardware. When the switching frequency is changed by hardware, for example, the switching frequency is changed such that the turn-on and turn-off of switches formed on a ladder are controlled to change a frequency setting resistance value.

The above description exemplifies the case where the switching frequency is changed based on the output current Iout when the high-voltage battery 113 is not being charged. Alternatively, the switching frequency may be fixed when the high-voltage battery 113 is not charged, and the switching frequency may be controlled based only on whether or not the high-voltage battery 113 is being charged.

A shunt resistance or a current transformer may be used instead of the current sensor 133 or the current sensor 181.

The pieces of processing may be performed by means of hardware or software. When the pieces of processing are performed by software, a program constituting the software is installed in a computer. Examples of the computer in this case include a computer, such as the controller 137, which is incorporated in the dedicated hardware, and a general-purpose personal computer in which various functions can be performed by installing various programs.

The program executed by the computer may be a program in which the pieces of processing are performed in time series in the order described herein or a program in which the pieces of processing are performed in parallel or at necessary timing such as invoking.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A DC-DC converter comprising:
a power conversion unit comprising a switching element, wherein the power conversion unit steps down a voltage of a first battery by driving the switching element, and wherein the power conversion unit supplies the stepped-down voltage to a second battery and a load;
a load amount detector that detects a load amount of the power conversion unit;
a charge detector that detects whether or not the first battery is being charged;
a switching frequency setting unit that sets a switching frequency of the switching element based on the load amount when the charge detector detects that the first battery is not being charged, and sets the switching frequency of the switching element to a predetermined value when the charge detector detects that the first battery is being charged; and
a switching controller that controls the driving of the switching element at the switching frequency set by the switching frequency setting unit.

2. The DC-DC converter according to claim 1, wherein the switching frequency setting unit sets the switching frequency to a lower value as the load amount is smaller when the charge detector detects that the first battery is not being charged.

3. The DC-DC converter according to claim 1, further comprising:
a temperature detector that detects a temperature around the switching element,
wherein the switching frequency setting unit sets the switching frequency based on the load amount and the temperature around the switching element when the charge detector detects that the first battery is not being charged.

4. The DC-DC converter according to claim 1,
wherein the load amount detector obtains a predicted value of the load amount, and
wherein the switching frequency setting unit sets the switching frequency based on the load amount or the predicted value of the load amount when the charge detector detects that the first battery is not being charged.

5. A DC-DC converter comprising:
a power conversion unit comprising a switching element, wherein the power conversion unit steps down a voltage of a first battery by driving the switching element, and wherein the power conversion unit supplies the stepped-down voltage to a second battery and a load;
a charge detector that detects whether or not the first battery is being charged;
a switching frequency setting unit that sets a switching frequency of the switching element to a value higher than that of a case where the charge detector detects that the first battery is being charged, when the charge detector detects that the first battery is not being charged; and
a switching controller that controls the driving of the switching element at the switching frequency set by the switching frequency setting unit.

* * * * *